US012412455B2

(12) United States Patent
Jaffe

(10) Patent No.: US 12,412,455 B2
(45) Date of Patent: Sep. 9, 2025

(54) GAMING SYSTEM AND METHOD WITH A PERSISTENT ELEMENT FEATURE

(71) Applicant: LNW Gaming, Inc., Las Vegas, NV (US)

(72) Inventor: Joel R. Jaffe, Glenview, IL (US)

(73) Assignee: LNW Gaming, Inc., Las Vegas, NV (US)

( * ) Notice: Subject to any disclaimer, the term of this patent is extended or adjusted under 35 U.S.C. 154(b) by 317 days.

(21) Appl. No.: 18/169,242

(22) Filed: Feb. 15, 2023

(65) Prior Publication Data

US 2024/0273975 A1 Aug. 15, 2024

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01); *G07F 17/3244* (2013.01)

(58) Field of Classification Search
None
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
5,395,111 A 3/1995 Inoue
5,431,408 A 7/1995 Adams
5,511,781 A 4/1996 Wood et al.
5,618,232 A 4/1997 Martin
5,695,188 A 12/1997 Shibashi
5,704,835 A 1/1998 Dietz
5,722,891 A 3/1998 Inoue
5,752,881 A 5/1998 Inoue
5,766,074 A 6/1998 Cannon et al.
5,788,573 A 8/1998 Baerlocher et al.
(Continued)

FOREIGN PATENT DOCUMENTS

AU 2013251288 A1 5/2014
AU 2014202042 A1 5/2014
(Continued)

*Primary Examiner* — Paul A D'Agostino

(57) ABSTRACT

There are provided a gaming machine and method that utilize game-logic circuitry and a presentation assembly configured to present a plurality of symbol-bearing reels, an array, and a plurality of persistent elements. The plurality of reels are spun and stopped to land symbols from the reels in the array. In response to the landed symbols including at least one accumulation condition, an animation portraying an increase in size or value of at least one of the plurality of persistent elements is presented. A random determination is made whether or not to award one or more of three game features associated with the persistent elements, the game features affecting either a determined outcome of the game, affecting the next purchased spin of the game, or initiating free spins of the game.

20 Claims, 13 Drawing Sheets

(56) References Cited

U.S. PATENT DOCUMENTS

| | | | |
|---|---|---|---|
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes, Jr. et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson, Jr. et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano, Jr. et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,346,043 | B1 | 2/2002 | Colin et al. |
| 6,364,766 | B1 | 4/2002 | Anderson et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,749,502 | B2 | 6/2004 | Baerlocher |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,855,053 | B2 | 2/2005 | Baerlocher |
| 6,869,360 | B2 | 3/2005 | Marks et al. |
| 6,878,061 | B2 | 4/2005 | Baerlocher et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,921,334 | B1 | 7/2005 | Bennett |
| 6,926,609 | B2 | 8/2005 | Martin |
| 6,960,134 | B2 | 11/2005 | Hartl et al. |
| 6,964,416 | B2 | 11/2005 | Mcclintic et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,065,215 | B2 | 6/2006 | Shirakawa et al. |
| 7,112,136 | B2 | 9/2006 | Anderson et al. |
| 7,121,945 | B2 | 10/2006 | Suganuma et al. |
| 7,137,886 | B2 | 11/2006 | Locke et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,294,055 | B2 | 11/2007 | Baerlocher et al. |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,494,412 | B2 | 2/2009 | Baerlocher |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,628,690 | B2 | 12/2009 | Englman et al. |
| 7,631,872 | B2 | 12/2009 | Roemer et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |
| 8,414,380 | B2 | 4/2013 | Saunders et al. |
| 8,465,358 | B2 | 6/2013 | Kemper |
| 8,480,473 | B2 | 7/2013 | Villejo et al. |
| 8,496,522 | B2 | 7/2013 | Caputo et al. |
| 8,512,121 | B2 | 8/2013 | Macvittie et al. |
| 8,512,124 | B2 | 8/2013 | Bramble et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,602,868 | B2 | 12/2013 | Johnson et al. |
| 8,608,545 | B2 | 12/2013 | Arora et al. |
| 8,662,986 | B2 | 3/2014 | Rodgers et al. |
| 8,678,908 | B2 | 3/2014 | Nicely |
| 8,690,660 | B2 | 4/2014 | Saunders et al. |
| 8,696,434 | B2 | 4/2014 | Tsukahara |
| 8,702,487 | B2 | 4/2014 | Thomas |

(56) References Cited

U.S. PATENT DOCUMENTS

| | | | | |
|---|---|---|---|---|
| 8,771,054 | B2 | 7/2014 | Aoki et al. | |
| 8,790,169 | B2 | 7/2014 | Saunders | |
| 8,795,059 | B2 | 8/2014 | Aoki et al. | |
| 8,821,254 | B2 | 9/2014 | Tsukahara | |
| 8,834,258 | B2 | 9/2014 | Gobe et al. | |
| 8,851,974 | B2 | 10/2014 | Caputo et al. | |
| 8,870,642 | B2 | 10/2014 | Leupp et al. | |
| 8,882,578 | B2 | 11/2014 | Saunders | |
| 8,961,291 | B2 | 2/2015 | Dias Pires et al. | |
| 9,005,022 | B2 | 4/2015 | Saunders | |
| 9,011,233 | B2 | 4/2015 | Ryan | |
| 9,098,847 | B2 | 8/2015 | Basallo et al. | |
| 9,098,973 | B2 | 8/2015 | Basallo et al. | |
| 9,147,321 | B2 | 9/2015 | Moody | |
| 9,165,433 | B2 | 10/2015 | Caputo | |
| 9,177,447 | B2 | 11/2015 | Zoltewicz et al. | |
| 9,202,345 | B2 | 12/2015 | Zoltewicz et al. | |
| 9,214,011 | B2 | 12/2015 | Wei et al. | |
| 9,230,410 | B2 | 1/2016 | Saunders et al. | |
| 9,245,421 | B2 | 1/2016 | Saunders et al. | |
| 9,251,667 | B2 | 2/2016 | Marks et al. | |
| 9,257,017 | B2 | 2/2016 | Saunders et al. | |
| 9,262,895 | B2 | 2/2016 | Rodgers et al. | |
| 9,275,524 | B2 | 3/2016 | Nicely | |
| 9,299,224 | B2 | 3/2016 | Leupp | |
| 9,311,781 | B2 | 4/2016 | Edwards | |
| 9,349,251 | B2 | 5/2016 | Caputo et al. | |
| 9,355,528 | B2 | 5/2016 | Nicely | |
| 9,418,521 | B1 | 8/2016 | Henrick et al. | |
| 9,424,720 | B2 | 8/2016 | Suda | |
| 9,430,900 | B2 | 8/2016 | Zoltewicz et al. | |
| 9,466,169 | B2 | 10/2016 | Basallo et al. | |
| 9,474,972 | B2 | 10/2016 | Lenger | |
| 9,495,839 | B2 | 11/2016 | Aoki et al. | |
| 9,595,157 | B2 | 3/2017 | Rasmussen et al. | |
| 9,633,506 | B2 | 4/2017 | Basallo et al. | |
| 9,704,342 | B2 | 7/2017 | Aoki et al. | |
| 9,928,691 | B2 | 3/2018 | Olive | |
| 10,013,855 | B2 | 7/2018 | Nakamura | |
| 10,037,651 | B2 | 7/2018 | You et al. | |
| 10,043,350 | B2 | 8/2018 | Gomez et al. | |
| 10,062,237 | B2 | 8/2018 | Devine et al. | |
| 10,204,473 | B2 | 2/2019 | Lenger | |
| 10,242,533 | B2 | 3/2019 | Okada et al. | |
| 10,339,761 | B2 | 7/2019 | Olive | |
| 10,366,575 | B2 | 7/2019 | Visser | |
| 10,388,112 | B2 | 8/2019 | You et al. | |
| 10,410,472 | B2 | 9/2019 | Moody | |
| 10,417,877 | B2 | 9/2019 | Gomez et al. | |
| 10,475,294 | B2 | 11/2019 | Gomez et al. | |
| 10,497,203 | B2 | 12/2019 | Elmqvist | |
| 10,672,220 | B2 | 6/2020 | Lenger | |
| 10,706,664 | B2 | 7/2020 | Boese et al. | |
| 10,726,676 | B2 | 7/2020 | You et al. | |
| 10,769,888 | B2 | 9/2020 | You et al. | |
| 10,839,648 | B2 | 11/2020 | Okada et al. | |
| 10,957,161 | B2 | 3/2021 | Chesworth et al. | |
| 11,017,638 | B2 | 5/2021 | Chesworth et al. | |
| 11,488,445 | B2 * | 11/2022 | Fong .................. | G07F 17/3241 |
| 2001/0021666 | A1 | 9/2001 | Yoshida et al. | |
| 2001/0041610 | A1 * | 11/2001 | Luciano ............. | G07F 17/3248 463/16 |
| 2002/0016200 | A1 | 2/2002 | Baerlocher et al. | |
| 2002/0045474 | A1 | 4/2002 | Singer et al. | |
| 2002/0119818 | A1 | 8/2002 | Savio et al. | |
| 2002/0142846 | A1 * | 10/2002 | Paulsen .............. | G07F 17/3262 463/43 |
| 2002/0155881 | A1 | 10/2002 | Yoshida | |
| 2002/0183105 | A1 | 12/2002 | Cannon et al. | |
| 2003/0017865 | A1 | 1/2003 | Beaulieu et al. | |
| 2003/0027619 | A1 | 2/2003 | Nicastro, Sr. | |
| 2003/0035346 | A1 | 2/2003 | Laughlin | |
| 2003/0064782 | A1 | 4/2003 | Beaulieu et al. | |
| 2003/0064801 | A1 | 4/2003 | Breckner et al. | |
| 2003/0064802 | A1 | 4/2003 | Rodgers et al. | |
| 2003/0069063 | A1 | 4/2003 | Bilyeu et al. | |
| 2003/0130034 | A1 | 7/2003 | Suganuma et al. | |
| 2003/0157978 | A1 * | 8/2003 | Englman ................ | G07F 17/32 463/16 |
| 2003/0157980 | A1 | 8/2003 | Loose et al. | |
| 2003/0216165 | A1 | 11/2003 | Singer et al. | |
| 2003/0236116 | A1 * | 12/2003 | Marks ................ | G07F 17/3244 463/16 |
| 2004/0012145 | A1 | 1/2004 | Inoue | |
| 2004/0023714 | A1 | 2/2004 | Asdale | |
| 2004/0043815 | A1 | 3/2004 | Kaminkow | |
| 2004/0048646 | A1 | 3/2004 | Visocnik | |
| 2004/0092315 | A1 | 5/2004 | Boyd et al. | |
| 2004/0137982 | A1 | 7/2004 | Cuddy et al. | |
| 2004/0171417 | A1 | 9/2004 | Beaulieu et al. | |
| 2004/0198489 | A1 | 10/2004 | Kaminkow et al. | |
| 2005/0054442 | A1 | 3/2005 | Anderson et al. | |
| 2005/0130731 | A1 | 6/2005 | Englman et al. | |
| 2005/0159208 | A1 | 7/2005 | Pacey | |
| 2005/0239542 | A1 * | 10/2005 | Olsen ................. | G07F 17/3258 463/27 |
| 2006/0009286 | A1 | 1/2006 | Durham et al. | |
| 2006/0035706 | A1 * | 2/2006 | Thomas ............. | G07F 17/3258 463/27 |
| 2006/0063581 | A1 * | 3/2006 | Harris ................ | G07F 17/3232 463/16 |
| 2006/0063588 | A1 | 3/2006 | Poole | |
| 2006/0073889 | A1 * | 4/2006 | Edidin .................... | G07F 17/32 463/27 |
| 2006/0111173 | A1 | 5/2006 | Yang | |
| 2006/0135254 | A1 * | 6/2006 | Thomas ................. | G07F 17/32 463/25 |
| 2006/0142080 | A1 | 6/2006 | Enzminger | |
| 2006/0178206 | A1 * | 8/2006 | Kraft ...................... | G07F 17/32 463/25 |
| 2006/0189369 | A1 | 8/2006 | Taylor | |
| 2006/0205469 | A1 | 9/2006 | Schultz et al. | |
| 2006/0247002 | A1 | 11/2006 | Yoshimi et al. | |
| 2007/0060248 | A1 | 3/2007 | Rodgers et al. | |
| 2007/0060255 | A1 | 3/2007 | Baerlocher et al. | |
| 2007/0060275 | A1 | 3/2007 | Gilmore et al. | |
| 2007/0129135 | A1 * | 6/2007 | Marks ................ | G07F 17/3262 463/20 |
| 2007/0149267 | A1 | 6/2007 | Ross et al. | |
| 2007/0232387 | A1 * | 10/2007 | Pace .................. | G07F 17/3241 463/25 |
| 2007/0281784 | A1 | 12/2007 | Seelig et al. | |
| 2007/0287529 | A1 | 12/2007 | Kojima | |
| 2008/0003278 | A1 | 1/2008 | Mondelo | |
| 2008/0004532 | A1 | 1/2008 | Rubey et al. | |
| 2008/0032784 | A1 | 2/2008 | Englman | |
| 2008/0045298 | A1 | 2/2008 | Yoshizawa | |
| 2008/0045320 | A1 | 2/2008 | Kato | |
| 2008/0076515 | A1 * | 3/2008 | Baerlocher ............. | G07F 17/32 463/20 |
| 2008/0076531 | A1 * | 3/2008 | Baerlocher ............. | G07F 17/32 463/25 |
| 2008/0108408 | A1 | 5/2008 | Wolf | |
| 2008/0108411 | A1 | 5/2008 | Jensen et al. | |
| 2008/0108422 | A1 | 5/2008 | Hedrick et al. | |
| 2008/0108431 | A1 | 5/2008 | Cuddy et al. | |
| 2008/0113779 | A1 * | 5/2008 | Cregan ............... | G07F 17/3258 463/27 |
| 2008/0132321 | A1 | 6/2008 | Pau | |
| 2008/0182647 | A1 | 7/2008 | Brunet De Courssou et al. | |
| 2008/0274789 | A1 | 11/2008 | Singer et al. | |
| 2009/0036202 | A1 * | 2/2009 | Baerlocher ......... | G07F 17/3244 463/25 |
| 2009/0036208 | A1 | 2/2009 | Pennington et al. | |
| 2009/0124350 | A1 * | 5/2009 | Iddings ............... | G07F 17/3262 463/20 |
| 2009/0156287 | A1 | 6/2009 | Baumgartner | |
| 2009/0181755 | A1 | 7/2009 | Gagner et al. | |
| 2009/0239634 | A1 | 9/2009 | Nguyen | |
| 2009/0291741 | A1 | 11/2009 | Schofield | |
| 2010/0075737 | A1 | 3/2010 | Bluemel | |
| 2010/0113133 | A1 | 5/2010 | Leupp | |
| 2010/0167815 | A1 | 7/2010 | Gagner et al. | |

(56) References Cited

U.S. PATENT DOCUMENTS

2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0244943 A1 10/2011 Milford et al.
2011/0300937 A1 12/2011 Crowder, Jr. et al.
2012/0015707 A1* 1/2012 Hornik ................ G07F 17/3258 463/20
2012/0034965 A1 2/2012 Masen et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0184351 A1* 7/2012 Hornik ................ G07F 17/3274 463/25
2012/0220360 A1 8/2012 Mcallister et al.
2012/0252562 A1* 10/2012 Aoki ....................... G07F 17/34 463/25
2013/0053124 A1 2/2013 Masen et al.
2013/0065663 A1 3/2013 Johnson et al.
2013/0102375 A1 4/2013 Aoki et al.
2013/0157741 A1* 6/2013 Pacey ................. G07F 17/3265 463/20
2013/0225262 A1* 8/2013 Thompson .......... G07F 17/3248 463/43
2013/0225263 A1* 8/2013 Thompson .......... G07F 17/3267 463/31
2013/0252704 A1 9/2013 Gilbertson et al.
2013/0260861 A1 10/2013 Vann et al.
2013/0324217 A1 12/2013 Gilbertson et al.
2014/0014186 A1 1/2014 Bhattacharya et al.
2014/0024429 A1 1/2014 Aoki et al.
2014/0051496 A1 2/2014 Meyer
2014/0141860 A1 5/2014 Meyer
2014/0179396 A1 6/2014 Aoki et al.
2014/0248938 A1* 9/2014 Tidke ...................... G07F 17/32 463/20
2014/0274292 A1 9/2014 Suda
2014/0274348 A1* 9/2014 Baerlocher ......... G07F 17/3267 463/26
2014/0287812 A1* 9/2014 Friedman ................ G07F 17/34 463/20
2014/0315619 A1* 10/2014 Bowers ............... G07F 17/3213 463/31
2014/0323198 A1 10/2014 Tuck
2015/0031437 A1 1/2015 Gomez et al.
2015/0170462 A1 6/2015 Berman et al.
2015/0206386 A1 7/2015 Jaffe et al.
2015/0269809 A1 9/2015 Smith
2015/0287269 A1 10/2015 Berman
2015/0356833 A1 12/2015 Aoki et al.
2015/0379831 A1 12/2015 Lee et al.
2016/0042597 A1 2/2016 Olive
2016/0055718 A1* 2/2016 Lyons ................. G07F 17/3258 463/27
2016/0155303 A1 6/2016 Aoki et al.
2017/0092048 A1* 3/2017 Fujisawa ............. G07F 17/3211
2017/0154498 A1 6/2017 Olive
2017/0372558 A1 12/2017 You et al.
2018/0130303 A1 5/2018 Lamb
2018/0268655 A1 9/2018 Olive
2018/0268659 A1 9/2018 Chesworth et al.
2019/0051097 A1 2/2019 Marks et al.
2019/0102992 A1 4/2019 You et al.
2019/0236905 A1 8/2019 Washington et al.
2019/0340886 A1* 11/2019 Humphrey .......... G07F 17/3293
2020/0090467 A1* 3/2020 Marks ................. G07F 17/3225
2020/0111322 A1* 4/2020 Däumling .............. G06Q 50/34
2020/0250921 A1* 8/2020 Hiten .................. G07F 17/3209
2020/0342715 A1* 10/2020 Hiten .................. G07F 17/3267
2021/0049869 A1* 2/2021 Chan ................... G07F 17/3267
2021/0056809 A1* 2/2021 Harris ..................... G07F 17/42
2021/0082249 A1* 3/2021 Kleine-Vossbeck ......................... G07F 17/3209
2021/0110633 A1* 4/2021 Halvorson .......... G07F 17/3206
2021/0110634 A1* 4/2021 Hiten .................. G07F 17/3213
2021/0110657 A1* 4/2021 Hiten .................. G07F 17/3244
2021/0110661 A1* 4/2021 Däumling ........... G07F 17/3213
2021/0142621 A1* 5/2021 Halvorson .......... G07F 17/3213
2021/0217276 A1* 7/2021 Sidoti ................. G07F 17/3213
2021/0241572 A1* 8/2021 Marks ................. G07F 17/3213
2021/0256812 A1* 8/2021 Kearns ................ G07F 17/3213
2021/0366237 A1* 11/2021 Bouvier .................. G07F 17/34
2021/0390821 A1* 12/2021 Hawkins ............. G07F 17/3213

FOREIGN PATENT DOCUMENTS

AU 2015210489 A1 2/2016
GB 2097160 A 10/1982
GB 2097160 B 5/1984
GB 2144568 A 3/1985
GB 2144568 B 9/1985
GB 2251112 A 6/1992

* cited by examiner

GAMING SYSTEM AND METHOD WITH A PERSISTENT ELEMENT FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to technological improvements in connection with a persistent element feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

There are provided a gaming machine and method that utilize game-logic circuitry and a presentation assembly configured to present a plurality of symbol-bearing reels, an array, and a plurality of persistent elements. The plurality of reels are spun and stopped to land symbols from the reels in the array. In response to the landed symbols including at least one accumulation condition, an animation portraying an increase in size or value of at least one of the persistent elements is presented. A random determination whether or not to award one or more game features is made. If the determination is to award the one or more game features, the one or more game features are implemented via the game-logic circuitry for either the current or one or more subsequent spins of the game. In accordance with one or more embodiments, the game includes three persistent elements. The first persistent element is associated with a game feature that, when awarded, affects an already determined outcome of the game. The second persistent element is associated with a game feature that, when awarded, affects the next purchased spin of the game. The third persistent element is associated with a game feature that, when awarded, may initiate free spins of the game. If the game feature associated with the third persistent element is awarded simultaneously with either of the other two game features, or both, the free spins are enhanced according to the additionally awarded game features.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A generally relates to a base-game portion of a wagering game; FIG. 3B generally relates to the awarding of one or more game features.

Figure 1:
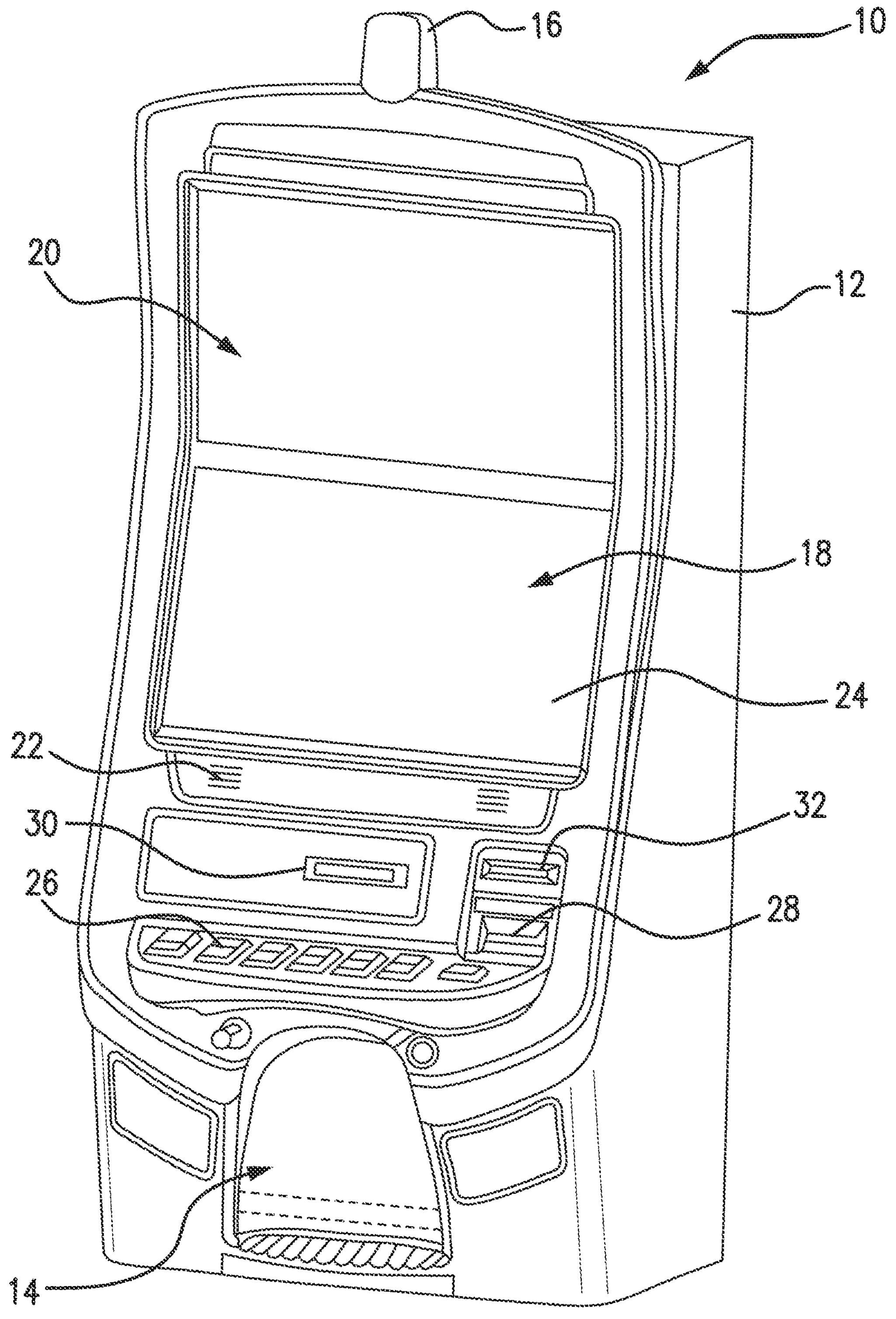
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22.

The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a “presentation assembly” of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a “Max Bet” button or soft key to indicate a player’s desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
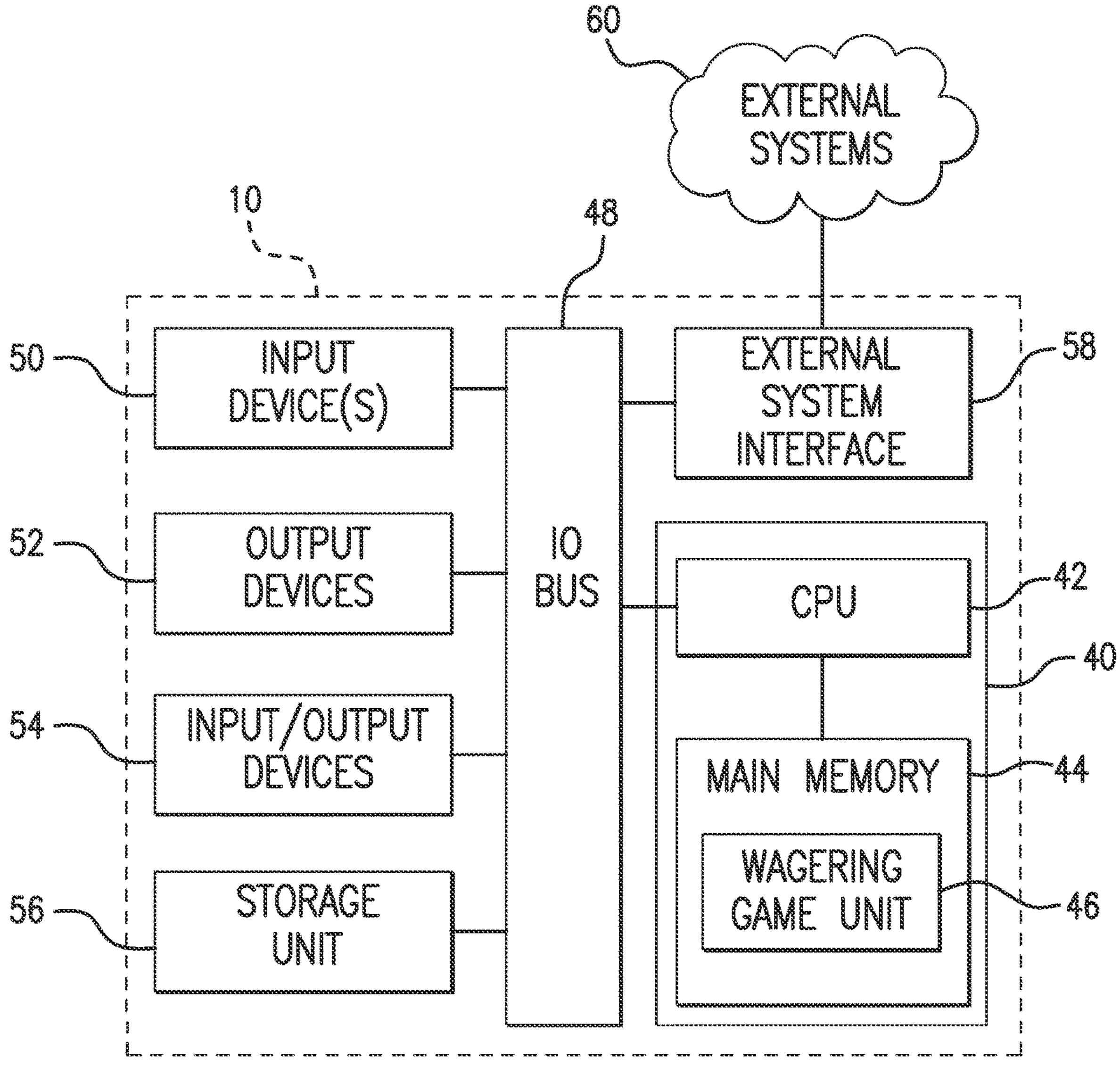
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40-whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
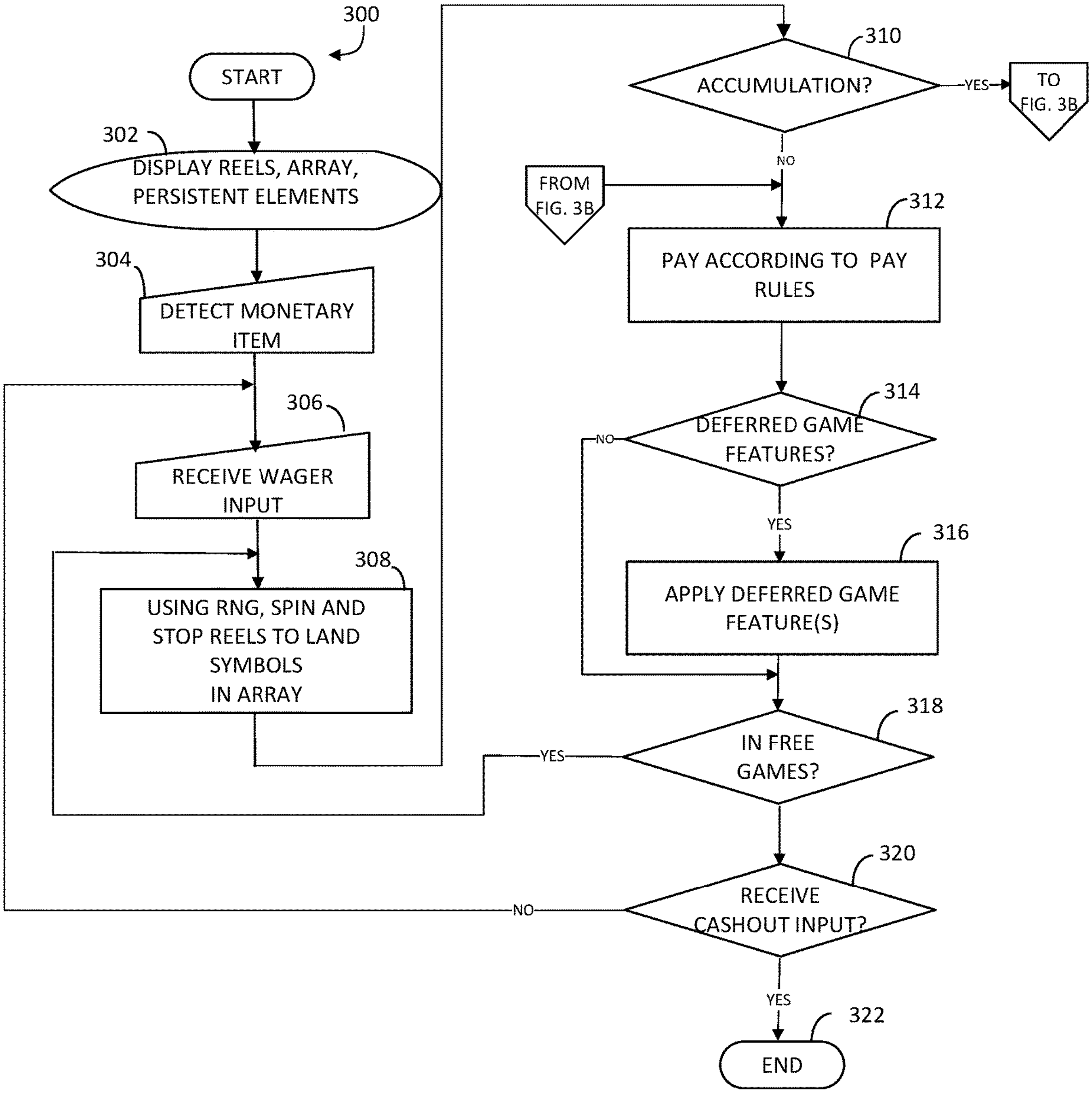
FIGS. 3A and 3B are a flow diagram for a data processing method that corresponds to instructions executed by a controller, according to an embodiment of the present invention.
Figure 3B:
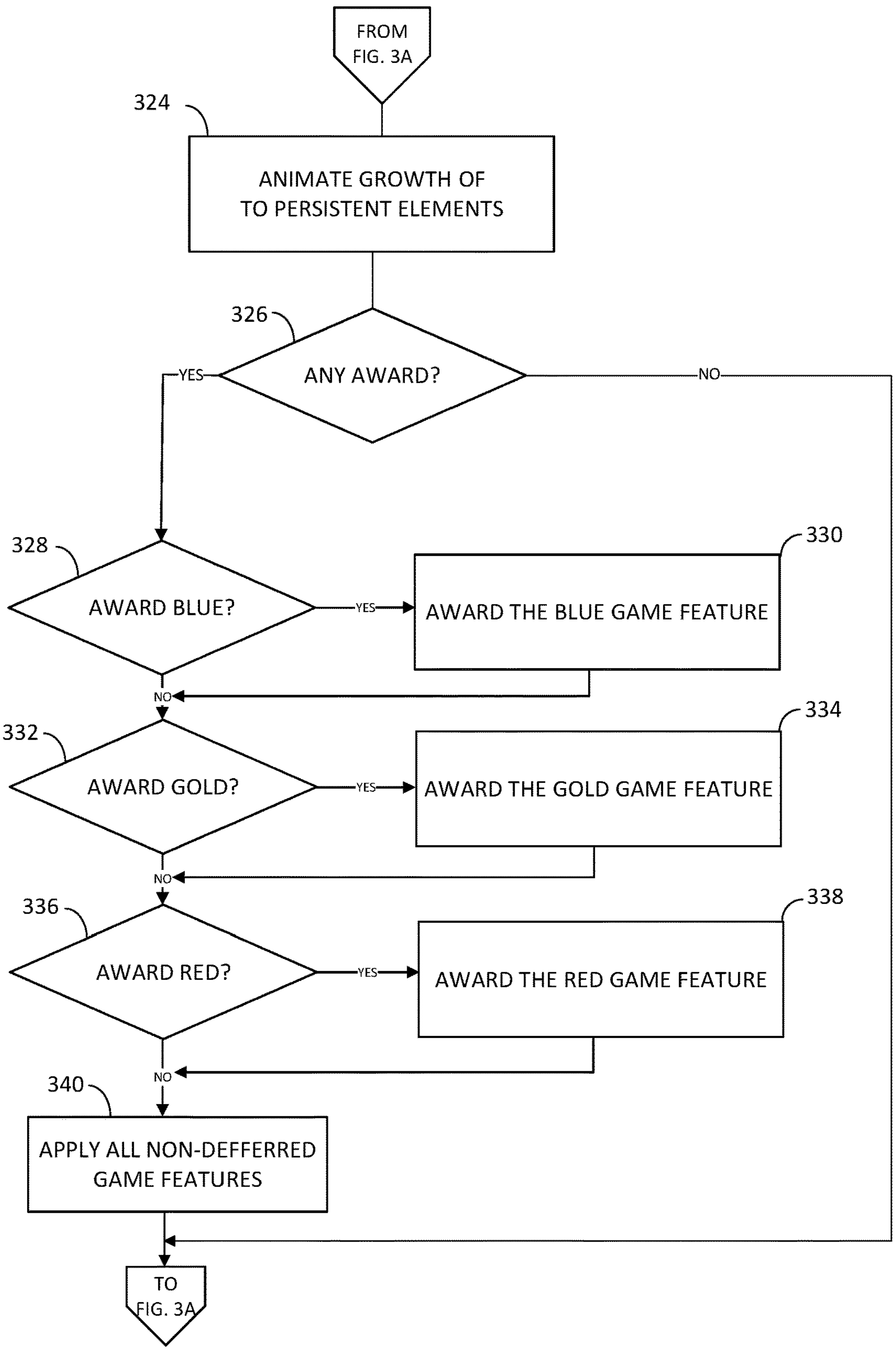

Referring now to FIGS. 3A-3B, there is shown a flow diagram representing one data processing method corresponding to at least some instructions stored and executed by the game-logic circuitry 40 in FIG. 2 to perform operations according to an embodiment of the present invention. The data processing method is described below in connection with the exemplary presentations of different spin outcomes in FIGS. 4-8.

Game Play Initiation

Referring to FIG. 3A, the data processing method commences at step 300. At step 302, the game-logic circuitry controls one or more presentation devices (e.g., mechanical-reel display device, video display device, or a combination thereof) to present a plurality of symbol-bearing reels, an array of symbol positions, and a plurality of persistent elements. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game (a spin of the game purchased via an accepted wager and not subject to any bonus rules) and any free games or other bonus games utilizing the array.

Figure 4:
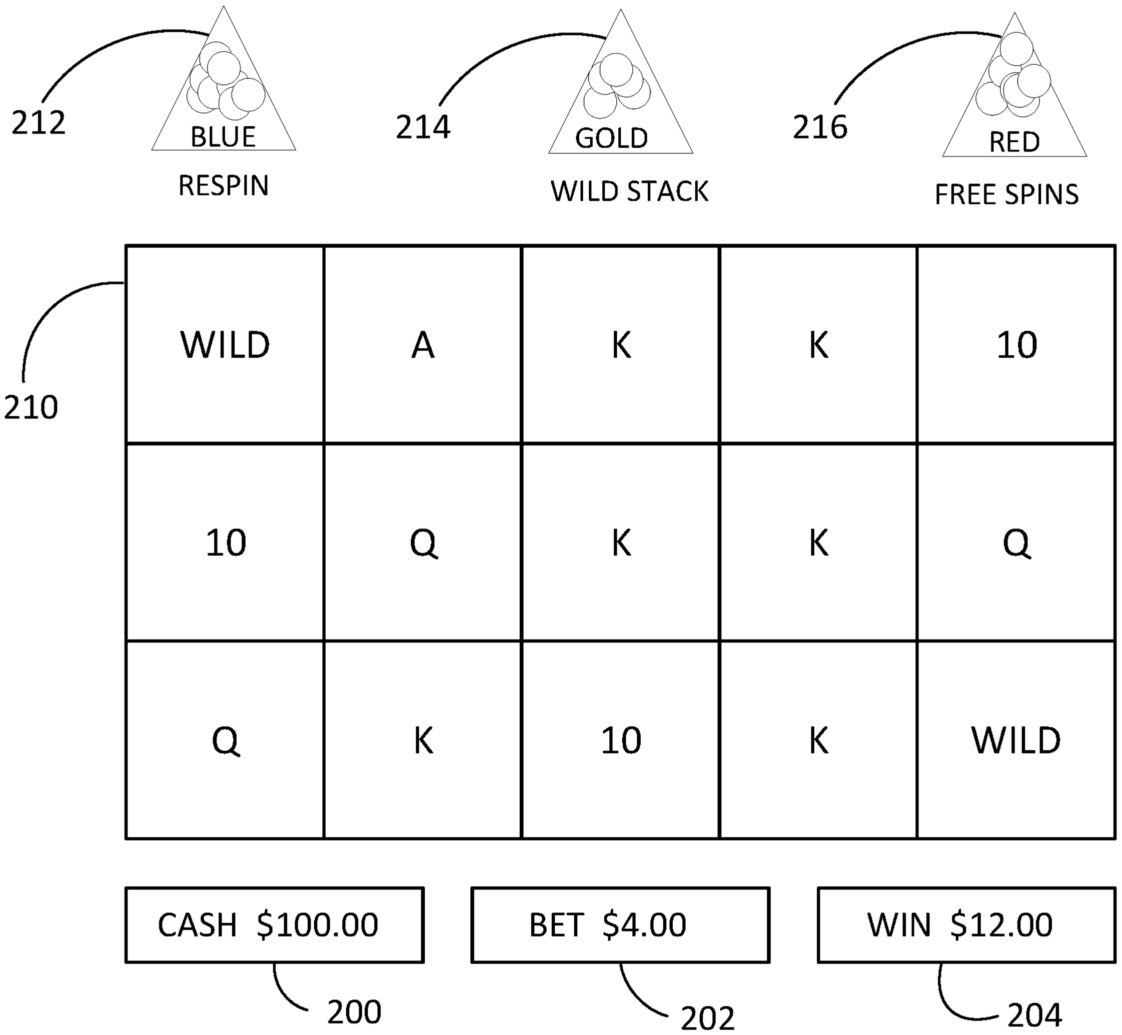
FIGS. 4-8 are exemplary presentations of game spin outcomes resulting from the flow diagram in FIGS. 3A-3B.

Referring to FIGS. 4-8, which illustrate examples of the display at the conclusion of various representative game spins, the symbol array 210 in the base game has a three-by-five rectangular configuration, and each symbol position is associated with a respective independent reel. The reels bear a plurality of symbols that may, for example, include various base game symbols 10, J, Q, K, A and a WILD symbol that can substitute for any of the base game symbols. The plurality of symbols may also include accumulation symbols, described below. An example of landed base game symbols is shown in FIG. 4. The symbol array need not have a three-by-five rectangular configuration. As one example, FIGS. 11-14 illustrate a four-by-five symbol array variation.

Each reel may contain one or more stacks (i.e., clumps) of symbols that appear adjacent to each other along the reel. Some or all of a stack may land in the array when its reel stops spinning. A stack of symbols may consist of two, three, four, or more like adjacent symbols. For example, in FIG. 4, two K symbols is illustrated in the third column of the symbol array 210 and three K symbols in the fourth column of the symbol array 210 are examples of landed symbols belonging to stacks.

Different game features of various types may be associated with the persistent elements 212, 214 and 216. In some embodiments, a game feature simply awards a prize, for example a fixed or progressive jackpot amount. In some embodiments, a game feature may comprise any type of bonus game. Non-limiting examples of bonus games include a certain number of free games (i.e., spins of the reels), a "pick' em" bonus game, a wheel-spinning game, etc. In still other embodiments, a bonus game may be played to determine payment of prize, for example, a fixed or progressive jackpot. In some embodiments, a game feature may comprise an enhancement to the game. An enhancement may include, without limitation, pay table modifiers such as multipliers, increased values on value-bearing symbols, modification to the reels to include improved symbols, such as wild symbols, modification of symbol weights or the removal of certain "blocking symbols", additional rows or columns added to the array, additional free spins, replacement symbols for symbols already present in the array, etc. The enhancement may be applied to the current base game outcome or may be applied to one or more subsequent bonus games or wagered base game plays, as will be shown. In some embodiments, a game feature may provide a second plurality of symbol-bearing reels and a second array of symbol positions to be filled, as described above, for a certain number of game cycles. Each game feature has a different impact on the expected value (EV) of the game. The relative frequency of the game features may be controlled by adjusting which coin pot they are associated with in the cascade sequence, for example. Thus, a less lucrative game feature may be won more frequently, for example, approximately once in every ten game spin cycles, while a higher paying game feature may only occur approximately once in every one hundred game spin cycles according to a weighted cascade value determination. This allows game features to be awarded more often, for player enjoyment, while maintaining the overall expected EV of the wagering game. In the examples described and illustrated by FIGS. 4-8 and the description of method 300, a "Respin" game feature is associated with the first persistent element 212, a "Wild Stack" game feature is associated with the second persistent element 214, and a "Free Spins" game feature is associated with the third persistent element 216.

In FIGS. 4-8, the persistent elements are represented as triangles. The persistent elements 212, 214 and 216 may take forms other than triangles, including, for example, unicorns, castles, coin pots, urns, vases, jars, jugs, cans, bowls, piggy banks, beehives, inflating balloons, ladders, dials, meters, etc. Similarly, the accumulation symbols associated with the persistent elements may take forms other than coins, including, for example, balloons, colored dollar signs, etc. The accumulation symbols may but need not be color-matched to their respective persistent elements, provided that their association to a persistent element is indicated. For example, the BLUE coins and the first persistent element 212 may be labeled or colored blue, the GOLD coins and the second persistent element 214 may be labeled or colored gold, and the RED coins and the third persistent element 216 may be labeled or colored red. Each accumulation symbol may have a unique form. In accordance with one or more embodiments, the accumulation symbol for each of the persistent elements may vary in form from one accumulation symbol to another. For example, one accumulation symbol may be a balloon while a second accumulation symbol may be a dollar sign and a third accumulation symbol may be coin, two accumulation symbols may be coins while a third accumulation symbol may be a dollar sign, etc.

At step 304, the game-logic circuitry detects, via a value input device, a physical item associated with a monetary value that establishes a monetary balance in the form of cash or credits. In FIGS. 4-8, the monetary balance may be shown on a meter 200.

Game Spin

At step 306, the game-logic circuitry initiates a game of a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4-8 the wager may be shown on a bet meter 202.

At step 308, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIGS. 4-8 depict various game spin outcomes.

Figure 5:
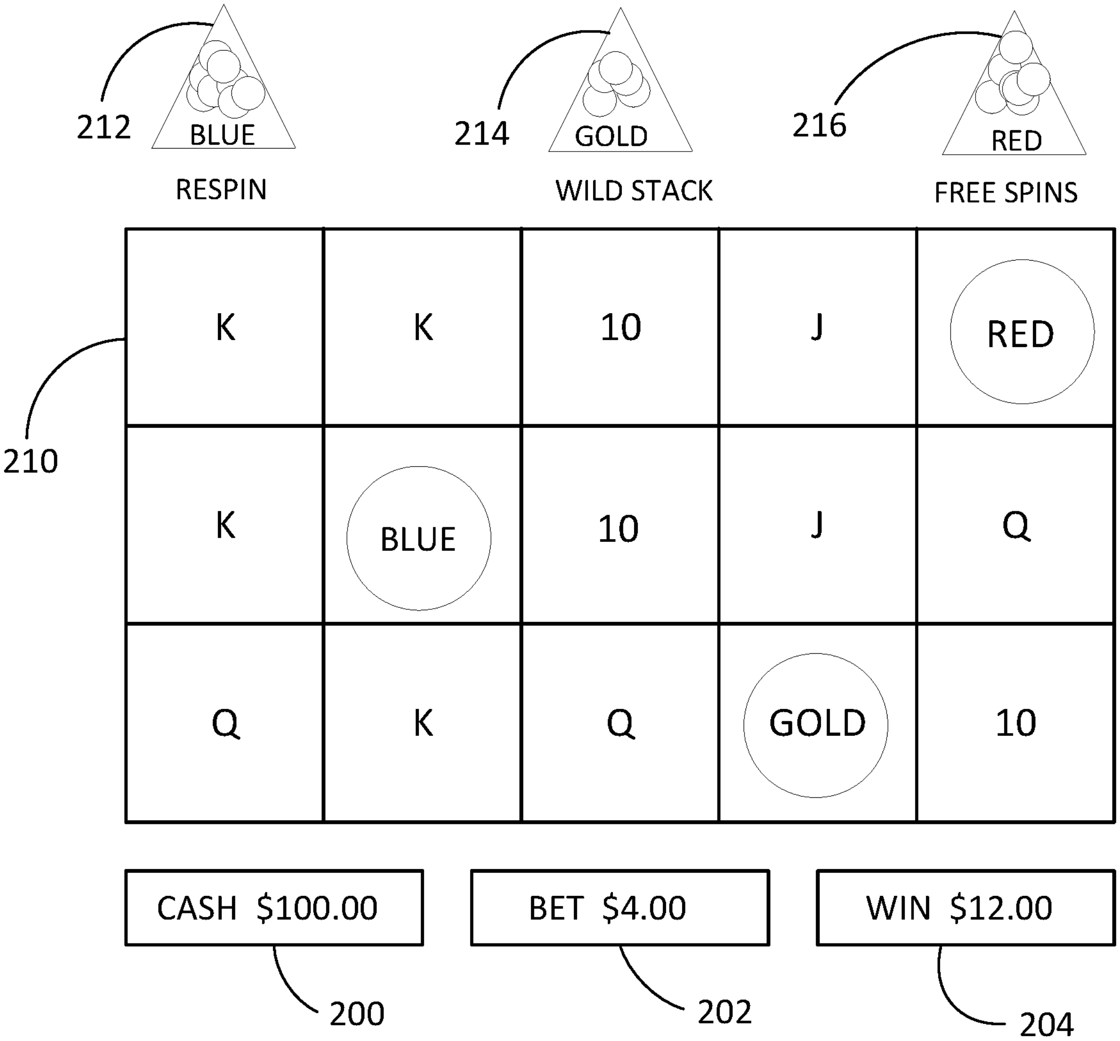

At step 310, the game-logic circuitry determines whether or not an accumulation condition appears in the array 210. An accumulation condition may be an individual accumulation symbol, as in the coin examples described here or a designated symbol combination (described below). FIG. 5 illustrates that the plurality of symbols also includes accumulation symbols in the form of BLUE, GOLD and RED coin symbols. Players hope to land the BLUE, GOLD or RED coin symbols in the symbol array 210 to win the application of the game features associated with three persistent elements 212, 214, 216. In the example of FIG. 5, a BLUE COIN is associated with the first persistent element 212, a GOLD coin is associated with the second persistent element 214, and a RED coin is associated with the third persistent element 216.

If no accumulation condition appears in the array 210, the game-logic circuitry proceeds to step 312, to be described later. If the game-logic circuitry determines that an accumulation condition appears in array 210, flow proceeds to step 324 of FIG. 3B, which will be described first.

Animation of Persistent Element Growth

During a player's gaming session, any growth in size of the persistent elements 212, 214 and 216 persists from one wagering game cycle to the next such that the player perceives that a game feature corresponding to a persistent element may be getting closer to being awarded. When the size of the persistent elements has no bearing on whether the associated game feature will actually be awarded, this is known as "perceived persistence." When a game feature associated with a persistent element is awarded, at least some of the contents of the persistent element are visually removed and the accumulation of value in that persistent element during subsequent game spin cycles resumes from that point. Each of the persistent elements 212, 214 and 216 exhibits perceived persistence.

Figure 6:
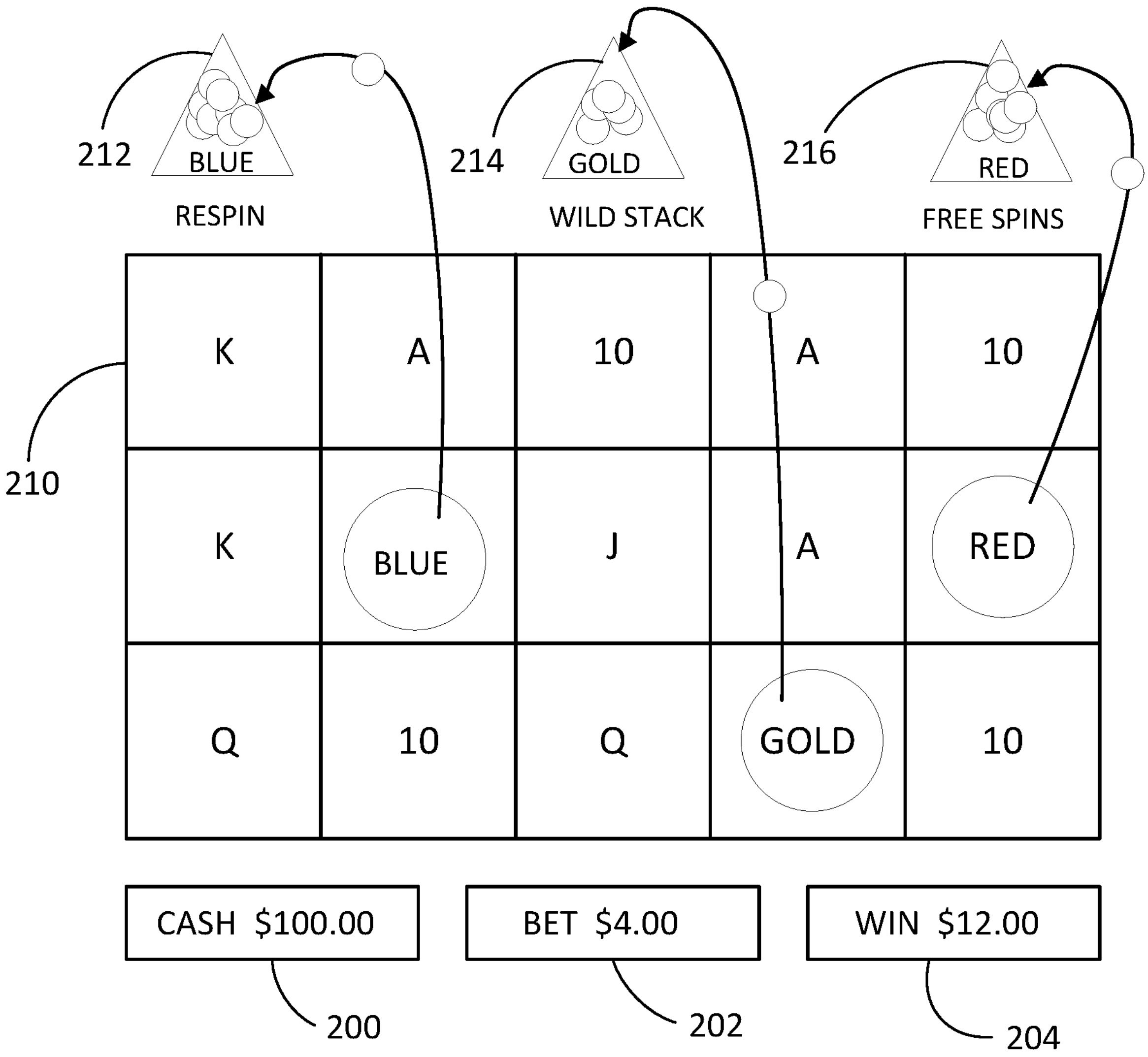

FIG. 6 illustrates the results of a game spin in which accumulation symbols have landed in the array. At step 324, the game-logic circuitry animates, via the one or more presentation devices, an addition of any coin in the array to the persistent element associated with the coin. To show the transfer of a coin symbol to a persistent element, the coin may be animated to "fly" from the array to land in its associated persistent element. To represent the gradual addition of coins to the persistent element, the persistent element and/or the volume of coins therein may appear to grow in size. In accordance with some embodiments, the persistent element may be an object of fixed size accompanied by some other indication of accumulating value, for example, by a gradual change in color shading, for example, from light red to dark red. In other embodiments, the persistent element may change size and also show some other indication of increasing value, for example, the color of the display in the immediate area of the persistent element may gradually change as its value increases. The size of a persistent element may or may not indicate the likelihood that its associated game feature will be awarded. This will be discussed further below.

In one or more embodiments, the coin symbols may be carried on the reels as "stickers" applied over an underlying standard reel symbol. As part of the animation sequence at step 324, in which the coin is transferred to its respective persistent element, the coin "sticker" is removed from its location in the reel array to reveal the standard reel symbol underneath. In other embodiments, the coin symbols may simply be removed from the array and replacement symbols may be randomly selected to take their places. In some embodiments, the coin symbols may remain in the array as "blocking symbols" that break up other potentially winning combinations of standard symbols. These approaches or combinations thereof all fall within the spirit and scope of the invention.

In FIG. 6, each transfer of a coin to the persistent elements 212, 214, 216 is represented by a "coin" circle and an arrow. See, for example, the arrow from the BLUE coin in the second column of the array 210, the arrow from the GOLD coin in the fourth column of the array 210, and the arrow from the RED coin in the fifth column of the array 210 in FIG. 6. Though not shown in FIG. 6, no coins, coins of only one or two colors or multiple coins of the same color/type may appear in the array at the same time. Animation representing the transfer each coin from the array 210 to its respective persistent element may be presented sequentially or in parallel.

Awarding of Game Features

At step 326, the game-logic circuitry randomly determines, via the RNG, whether or not to award the game features associated with any coin symbols detected at step 310. This random determination is independent of any prior wagering game cycles. A single determination may be made whether to award all of the game features associated with persistent elements that underwent accumulation at step 324 or step 326 may simply test to see whether it is possible that an RNG determination made at each of steps 328, 33 and 336 may award a game feature.

Figure 7:
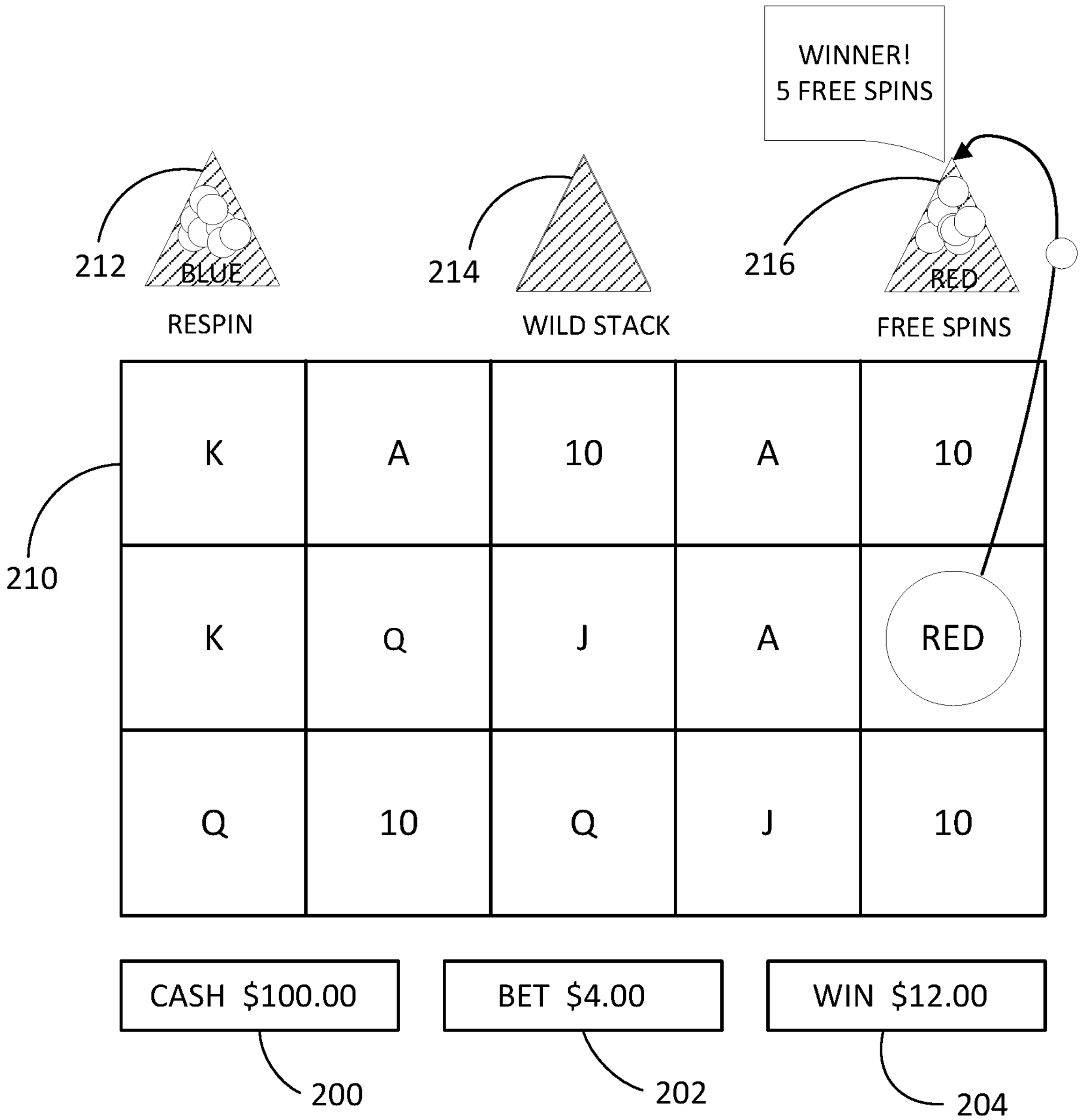

In accordance with one or more embodiments, the odds of awarding the game features with a single RNG determination at step 326 may increase according to the number of coins appearing in the array. This may be accomplished, for example, by changing weights associated with the random determination. In other embodiments, the appearance of multiple coins in the array has no effect on the probability of awarding the game features associated with the persistent elements corresponding to the coins appearing in the array. If the game features are awarded, for each coin symbol detected at step 310, an indication such as a "WINNER!" label may appear next to each respective coin's associated persistent element, or the respective persistent element may be otherwise highlighted. Persistent elements associated with non-awarded game features may be further deemphasized, for example, by shading or "greying" them out. FIG. 7 illustrates an example of a game spin in which only the RED game feature has been won.

If it is determined at step 326 that no game features will be awarded, the game-logic circuitry returns to FIG. 3A and proceeds to step 312, described further below. If, however, at least one game feature will be awarded, the game-logic circuitry instead proceeds to step 328 to begin the process of awarding the one or more game features.

At step 328, if at least one BLUE coin associated with the first persistent element 212 was present in the array 210 at step 310 and it was determined at step 326 that the BLUE game feature would be awarded, the game logic circuitry awards the game feature associated with the first persistent element 212 at step 330. As mentioned above, in some embodiments, step 328 may also include a separate RNG determination of whether or not to award the BLUE game feature. If such an additional determination is made at step 328 and it is determined that the BLUE game feature will not be awarded, the game-logic circuitry continues the flow at step 332 and step 330 is not performed.

In the examples shown in FIGS. 4-8, the game feature associated with the first persistent element 212 is "Respin." This exemplar game feature holds certain symbols in place in the array, for example all K and WILD symbols, and respins the reels to land new symbols in the remaining locations in the array to determine a final outcome for the spin. Thus, the "Respin" game feature is an "instant" game feature that is applied only to the current game outcome. Once the "Respin" game feature has been awarded at step 330, including modification of the landed symbols in the array, the game logic circuitry proceeds to step 332.

At step 332, if at least one GOLD coin associated with the second persistent element 214 was present in the array 210 at step 310 and it was determined at step 326 that the GOLD game feature would be awarded, the game logic circuitry awards the game feature associated with the second persistent element 214 at step 334. As mentioned above, in some embodiments, step 332 may also include a separate RNG determination of whether or not to award the GOLD game feature. In these situations, if, at step 332, it is determined that the GOLD game feature will not be awarded, the game-logic circuitry continues the flow at step 336 and step 334 is not performed.

In the example shown, the game feature associated with the second persistent element 214 is "Wild Stack," in which a full stack of symbols on a reel will be replaced by wild symbols and held in place on the next spin. Thus, the "Wild Stack" game feature is a "deferred" game feature that is applied to and affects the next game spin. Once the "Wild Stack" game feature has been awarded at step 334, the game logic circuitry proceeds to step 336.

At step 336, if at least one RED coin associated with the third persistent element 216 was present in the array 210 at step 310 and it was determined at step 326 that the RED game feature would be awarded, the game logic circuitry awards the game feature associated with the third persistent element 216 at step 338. Again, in some embodiments, step 336 may also include a separate RNG determination of whether or not to award the RED game feature. In these cases, if, at step 336, it is determined that the RED game feature will not be awarded, the game-logic circuitry continues the flow at step 340 and step 338 is not performed.

In the example shown, the game feature associated with the third persistent element 216 is a "Free Spins" game feature. FIG. 7 illustrates an example of a game outcome that awards free spins. In some embodiments, the number of free spins is predetermined. A certain number of free spins, for example, five free spins, will be initiated with the number of free spins remaining tracked by a free spin counter 230. In other embodiments, the number of free spins may be randomly determined and vary between each awarding of free spins. The free spins may be played in a "hold and spin" manner where certain types of symbols, once landed in the array, are held in place and may variously persist in the array for at least one additional free spin cycle, until they contribute to a winning outcome, until all of the free spins have been played, etc. In some embodiments, wild symbols or other symbols that may improve the chances of winning or provide higher pays may also be held. Like the "Wild Stack" game feature, the "Free Games" feature is a "deferred" game feature. Once applied, as described below with respect to step 314, reel strip layouts may remain the same as those of the base game or may be different. Once the game feature has been awarded at step 338, the game logic circuitry proceeds to step 340.

Applying Non-Deferred Game Features

Once all of the eligible game features have been awarded at one or more of steps 330, 334 and 338, subsequent games will be played according to game rules and conditions set by the one or more awarded game features, enhancing the excitement and EV of the game.

At step 340, any non-deferred game features are applied. Any deferred game features will be applied later (at step 316). In this example, if the "Respin" game feature was awarded at step 330, the reels will be respun and any locations in the array not held in place will receive newly landed symbols. Thus, the game feature is applied to the original outcome of the current game cycle prior to win evaluation. The game logic circuitry then returns to FIG. 3A, step 312.

Win Evaluation

Figure 8:
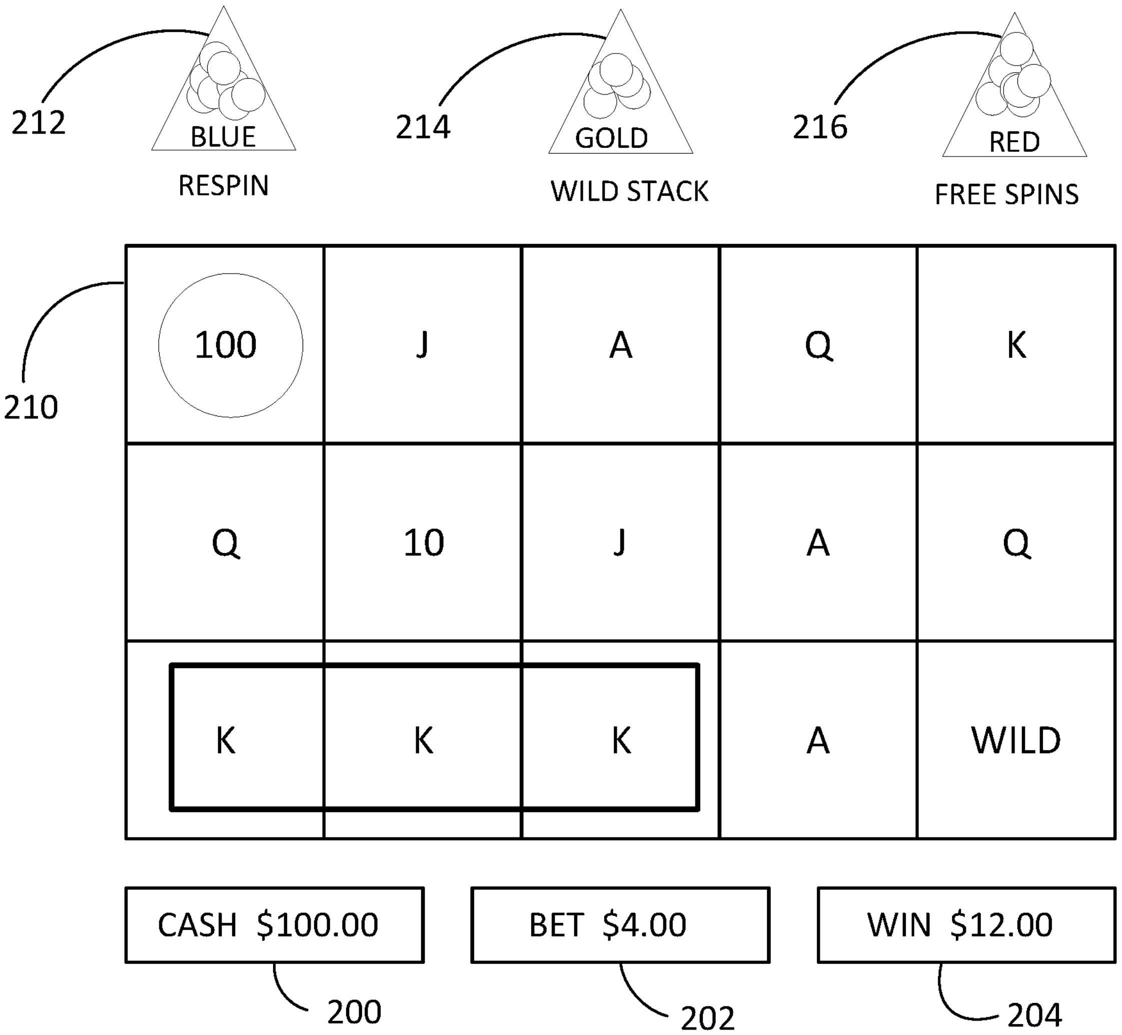

Once any animation of persistent element growth has occurred, any game features have been awarded and any instant game features applied, the game-logic circuitry evaluates the symbols in the array at step 312. Payouts are awarded in accordance with pay rules. The pay rules may include a pay table. The pay table may, for example, include "line pays," "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. For the sake of simplicity, the examples shown here are line pays. FIG. 8, for example, depicts a line pay of three K symbols in the bottom row of the array 210. The awarded pay is added to a win meter 204.

Applying Deferred Game Features

At step 314, a check for any awarded but deferred game features is performed. If no deferred game features have been awarded, flow proceeds to step 318, otherwise, the deferred game features are applied at step 316. Because deferred game features are applied to the game after win evaluation, deferred game features apply to one or more subsequent game spins.

For example, if the "Wild Stack" game feature was awarded at step 334, the symbols in the array positions containing the triggering stack of symbols will be replaced with wild symbols to be held in place when the next reel spin occurs at step 308. If current game cycle is a regular paid game cycle financed by a wager (a base game), this deferred game feature will be applied to the next paid game spin.

In another example, if the "Free Spins" game feature was awarded at step 338, the free spin counter 230 will be initialized and the game placed in a free spin state. Other free spin rule changes or reel layouts may also be applied at this time and will be in effect for the duration of the free spins. Thus, this game feature also applies to subsequent game spins, the primary difference between this feature and the "Wild Stack" feature being that the subsequent spins do not require a wager.

It should be noted that multiple game features may be awarded if coins of more than one color appear simultaneously in the array 210. Thus, one, two or three game features may be awarded as the result of a single spin and complement one another in increasing the excitement of the game. For example, in the case where all three game features are simultaneously awarded, the current array 210 will be modified per the "Respin" feature, any wins will be paid, then the "Wild Stack" modification will be applied to the reels in advance of the next spin, which, because the "Free Spins" game feature was awarded, will also not require placement of a wager.

At step 318, the game-logic circuitry checks to see whether the game is in a free spin state as a result of free games having been previously initiated at step 316 in either the current or a prior game cycle. If the game is in a free game state, the game logic circuitry returns to step 308 for another spin without requiring a wager.

Game Play Continuation/Termination

At step 320, the game-logic circuitry determines whether or not it has received a cashout input via at least one of the one or more player input devices of the gaming machine. If it has not received a cashout input, the game-logic circuitry waits for the next wager input at step 306. If it has received a cashout input, the game-logic circuitry initiates a payout from the monetary balance on the meter 200 in FIGS. 4-8. The data processing method then ends at step 322.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the game feature awarding process, if accumulation condition appears in the array at step 310, the game-logic circuitry foregoes any random determination of whether a game feature will be awarded. Furthermore, if any coin symbols do appear in the array, regardless of the number of pots and associated game features that may be won in parallel, only a single invocation of the RNG at step 326 is required to determine whether any game feature will actually be awarded. In contrast, in typical prior art systems with mystery bonus triggers, the game-logic circuitry makes a random determination in each and every wagering game cycle and for each and every game feature that may be won, thereby reducing processing efficiency compared to the method presented herein.

In this description, numerous specific details are set forth. However, it is understood that embodiments of the invention may be practiced without these specific or with slightly varying details.

For example, in accordance with one or more embodiments, the displayed size of a perceived persistence/true persistence persistent element may partially represent the likelihood that its associated game feature will be awarded.

Figure 9:
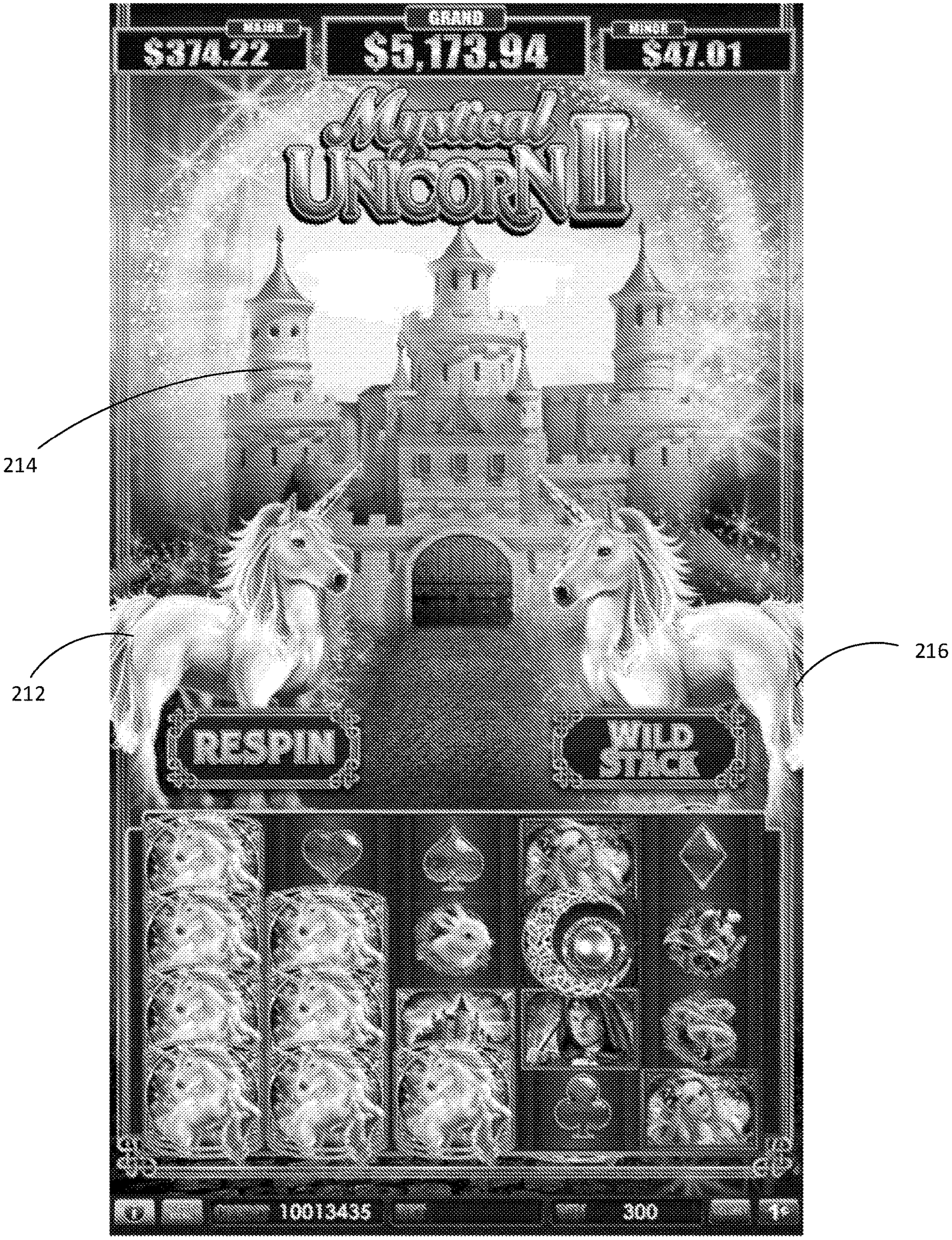
FIGS. 9-12 are exemplary presentations of game spin outcomes in accordance with alternate embodiments of the invention.

In another example, in accordance with still other embodiments, each persistent element need not be of the same form, for example, the triangles of FIGS. 4-8 may vary from one persistent element to the next, for example, persistent element may be represented as triangle, one as a square and one as a circle. As a further example, FIG. 9 illustrates that two of the persistent elements 212, 216 may be portrayed as unicorns, while one persistent element 214 may be portrayed as a castle.

Figure 10:
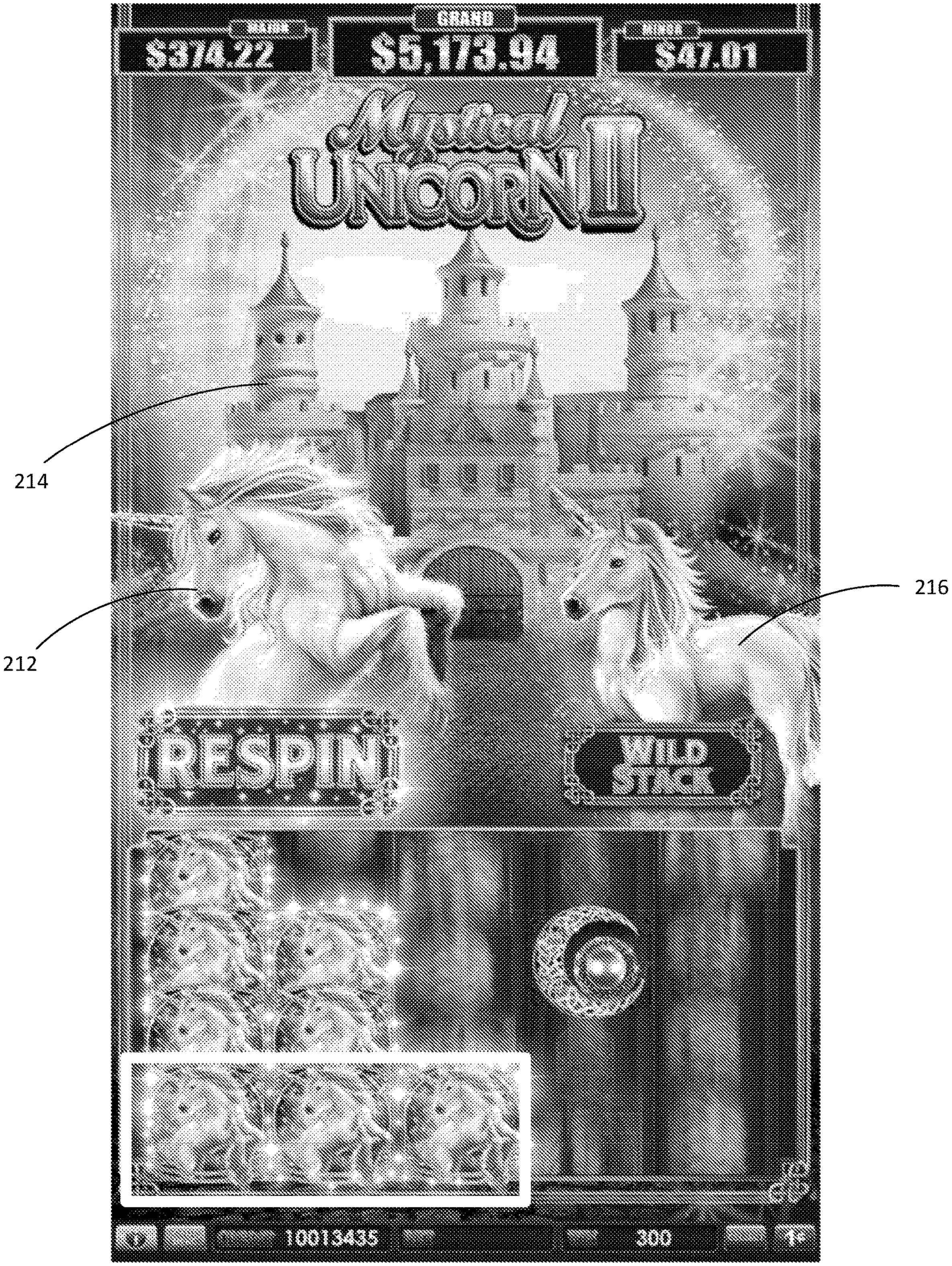

In accordance with some embodiments, certain combinations of symbols may take the place of the discrete designated symbols such as the BLUE, GOLD and RED accumulation symbols of FIGS. 4-8. In one example, a winning combination of designated symbols, in addition to earning an award, may increase the perceived persistence aspect of an associated persistent element and potentially trigger the awarding of its associated game feature. To illustrate, a winning combination of a designated symbols, as represented by a box around three unicorn symbols in the bottom row of FIG. 10, increases the size of the first persistent element 212 and potentially triggers awarding the "Respin" game element. In the example of FIG. 10, the first persistent element 212 has increased in size compared to its size in FIG. 9 while the other two persistent elements 214 and 216 have remained the same size. In addition, the "Respin" game element has been awarded, as indicated by the highlighted nature of its label in FIG. 10 compared to its appearance in FIG. 9. In the example of FIG. 10, as a non-deferred game feature, the application of the "Respin" game feature has held all unicorn and wild symbols (the "pearl" symbol in the fourth column of the array) and the reels are currently being re-spun as described above with respect to step 330.

Figure 11:
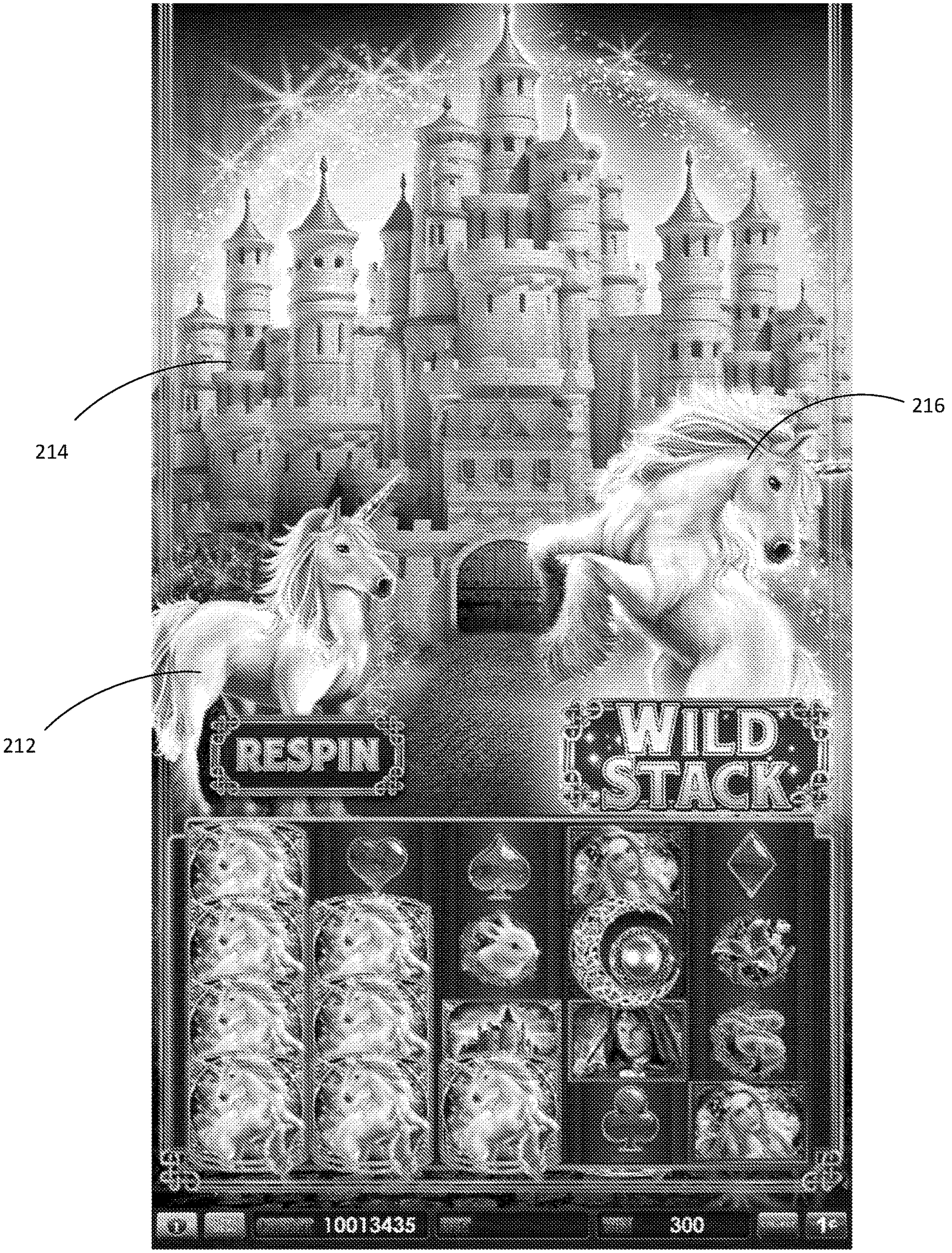
Figure 12:
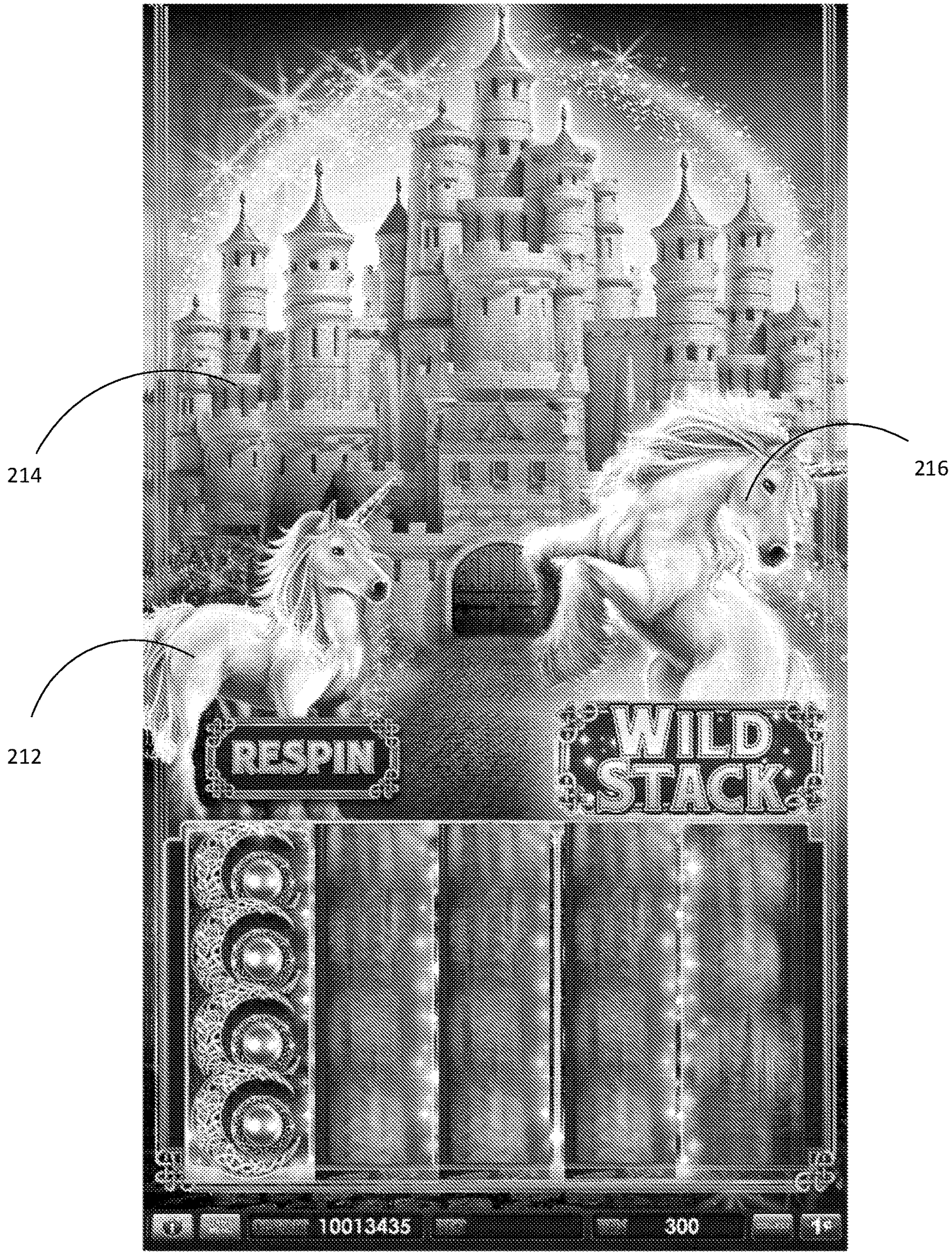

In another example, the combination of symbols need not be a winning combination of symbols. In the illustration of FIG. 11, a full stack of unicorn symbols appears in the first column of the array. A full column of a designated symbol may be defined as the triggering combination for increasing the size of a persistent element, in this case, the third persistent element 216, and potentially awarding its associated game feature. In the example of FIG. 11, the third persistent element 216 has increased in size compared to its size in FIG. 9. In addition, the deferred "Wild Stack" game element has been awarded, as indicated by the highlighted nature of its label in FIG. 11 compared to its appearance in FIG. 9. In the example of FIG. 12, which represents the next paid spin, application of the "Wild Stack" game feature has held the triggering stack of symbols in place and replaced them with wild symbols, as indicated by the stack of "pearl" symbols in the first column of the array. The reels are currently being re-spun as described above with respect to step 334.

In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

accepting, via a value input device, a physical item associated with a monetary value to establish a monetary balance;

conducting, by game-logic circuitry, a game including:

presenting, by a presentation assembly, a plurality of symbol-bearing reels, an array, a first persistent element comprising an associated first game feature and an associated first accumulation condition, a second persistent element comprising an associated second game feature and an associated second accumulation condition, and a third persistent element comprising an associated third game feature and an associated third accumulation condition;

spinning and stopping the plurality of reels to land symbols from the reels in the array to produce a first outcome purchased via an accepted wager; and in response to the first outcome including the first accumulation condition:

animating accumulation of the first persistent element; and randomly determining whether or not to award the first game feature; and in response to awarding the first game feature, applying changes associated with the first game feature to the landed symbols;

in response to the first outcome including the second accumulation condition:

animating accumulation of the second persistent element; and randomly determining whether or not to award the second game feature; and in response to awarding the second game feature, applying changes associated with the second game feature to the game, prior to a second outcome purchased via an accepted wager;

in response to the first outcome including the third accumulation condition:

animating accumulation of the third persistent element; and randomly determining whether or not to award the third game feature; and in response to awarding the third game feature, applying changes associated with the third game feature to the game prior to spinning and stopping the plurality of reels to land symbols from the reels in the array to produce a third outcome, wherein the changes associated with the third game feature comprise awarding of free spins such that the third outcome is a free outcome not requiring acceptance of a wager; and receiving, via at least one of one or more electronic input devices, a cash out input that initiates a payout from the monetary balance via a value output device.

2. The method of claim 1, wherein the accumulation conditions comprise a single designated reel symbol in the array.

3. The method of claim 1, wherein the accumulation conditions comprise a winning combination of designated symbols in the array.

4. The method of claim 1, wherein the accumulation conditions comprise a non-winning combination of designated symbols in the array.

5. The method of claim 4, wherein the non-winning combination of symbols comprises a stack of like symbols.

6. The method of claim 1, wherein the free spins comprise a randomly determined number of spins.

7. The method of claim 1, wherein the gaming machine is primarily dedicated to playing a wagering game.

8. The method of claim 1, wherein the animating operations include increasing a size of each respective persistent element or a volume of items therein.

9. The method of claim 8, wherein randomly determining whether or not to award the game features is based, at least in part, on the size of the persistent element associated with each respective persistent element or the volume of items therein.

10. The method of claim 1, wherein applying the changes associated with the second game feature occurs after evaluation of the array for winning symbol combinations in the first outcome.

11. A gaming machine comprising:

a presentation assembly;

a value input device configured to accept a physical item associated with a monetary value to establish a credit balance;

a value output device configured to dispense a payout from the credit balance in response to a cashout input; and game-logic circuitry configured to perform the operations of:

conducting a game including:

presenting, by the presentation assembly, a plurality of symbol-bearing reels, an array, a first persistent element comprising an associated first game feature and an associated first accumulation condition, a second persistent element comprising an associated second game feature and an associated second accumulation condition, and a third persistent element comprising an associated third game feature and an associated third accumulation condition;

spinning and stopping the plurality of reels to land symbols from the reels in the array to produce a first outcome purchased via an accepted wager; and in response to the first outcome including the first accumulation condition:

animating accumulation of the first persistent element; and randomly determining whether or not to award the first game feature; and in response to awarding the first game feature, applying changes associated with the first game feature to the landed symbols;

in response to the first outcome including the second accumulation condition:

animating accumulation of the second persistent element; and randomly determining whether or not to award the second game feature; and in response to awarding the second game feature, applying changes associated with the second game feature to the game, prior to a second outcome purchased via an accepted wager;

in response to the first outcome including the third accumulation condition:

animating accumulation of the third persistent element; and randomly determining whether or not to award the third game feature; and in response to awarding the third game feature, applying changes associated with the third game feature to the game prior to spinning and stopping the plurality of reels to land symbols from the reels in the array to produce a third outcome, wherein the changes associated with the third game feature comprise awarding of free spins such that the third outcome is a free outcome not requiring acceptance of a wager.

12. The gaming machine of claim 11, wherein the accumulation conditions comprise a single designated reel symbol in the array.

13. The gaming machine of claim 11, wherein the accumulation conditions comprise a winning combination of designated symbols in the array.

14. The gaming machine of claim 11, wherein the accumulation conditions comprise a non-winning combination of designated symbols in the array.

15. The gaming machine of claim 14, wherein the non-winning combination of symbols comprises a stack of like symbols.

16. The gaming machine of claim 11, wherein the free spins comprise a randomly determined number of spins.

17. The gaming machine of claim 11, wherein the gaming machine is primarily dedicated to playing a wagering game.

18. The gaming machine of claim 11, wherein the animating operations include increasing a size of each respective persistent element or a volume of items therein.

19. The gaming machine of claim 11, wherein randomly determining whether or not to award the game features is based, at least in part, on the size of the persistent element associated with each respective persistent element or the volume of items therein.

20. The gaming machine of claim 11, wherein applying the changes associated with the second game feature occurs after evaluation of the array for winning symbol combinations in the first outcome.

* * * * *